United States Patent
Kasuga

(10) Patent No.: US 7,808,679 B2
(45) Date of Patent: Oct. 5, 2010

(54) PRINTING SYSTEM FOR OPERATING MARGINLESS PRINTING ON ROLL PAPER

(75) Inventor: Nobuyuki Kasuga, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/365,018

(22) Filed: Mar. 1, 2006

(65) Prior Publication Data

US 2006/0197964 A1   Sep. 7, 2006

(30) Foreign Application Priority Data

Mar. 2, 2005   (JP) ............... 2005-057448

(51) Int. Cl.
G06F 3/12 (2006.01)
G06K 15/02 (2006.01)
G06K 1/00 (2006.01)
H04N 1/387 (2006.01)
H04N 1/40 (2006.01)
H04N 1/393 (2006.01)

(52) U.S. Cl. .............. 358/451; 358/1.2; 358/449; 358/400; 358/1.1

(58) Field of Classification Search ............ None
See application file for complete search history.

(56) References Cited

U.S. PATENT DOCUMENTS 4,731,658 A * 3/1988 Koseki ............... 358/449
6,746,101 B2 * 6/2004 Otsuki ............... 347/37
6,831,683 B2 * 12/2004 Ogiwara ............... 348/207.2
7,224,482 B2 * 5/2007 Shima ............... 358/1.18
7,352,487 B2 * 4/2008 Tokashiki ............... 358/1.18
7,375,845 B2 * 5/2008 Shiota et al. ............... 358/1.6
2002/0036665 A1   3/2002 Shima
2002/0181022 A1 * 12/2002 Tokashiki ............... 358/1.18
2005/0088694 A1 * 4/2005 Ogiwara ............... 358/1.18
2009/0073463 A1 * 3/2009 Yamada ............... 358/1.2

FOREIGN PATENT DOCUMENTS

| EP | 1315363 A2 * | 5/2003 |
|---|---|---|
| JP | 11-321016 | 11/1999 |
| JP | 2001-047684 | 2/2001 |
| JP | 2002-091723 | 3/2002 |
| JP | 2004001312 A * | 1/2004 |
| JP | 2004-268364 | 9/2004 |

* cited by examiner

*Primary Examiner*—Twyler L Haskins
*Assistant Examiner*—Myles D Robinson
(74) *Attorney, Agent, or Firm*—Canon USA Inc IP Div

(57) ABSTRACT

A printing system performing marginless printing. The system includes a host device operable to send image data, and a recording device performs marginless recording based on the image data received from the host device. The system includes a setting unit setting the width of the recording medium, a changing unit changing scaling ratio of the image data based on the width of the recording medium. Furthermore the system includes a recording unit recording the image on the recording medium based on the image data with the changed scaling ratio. An image is enlarged/reduced to the width of the roll paper sheet, thereby loss portions in the longitudinal direction are controlled to a minimum.

8 Claims, 8 Drawing Sheets

NORMAL ENLARGEMENT

ENLARGEMENT TO ROLL PAPER WIDTH

PRINTING SYSTEM FOR OPERATING MARGINLESS PRINTING ON ROLL PAPER

BACKGROUND OF THE INVENTION

1. Field of the Invention

The present invention relates to a printing system for performing marginless printing on roll paper, and more specifically to a recording method and a recording device.

2. Description of the Related Art

In recent years, there has been an increasing need for printing photographs by a printer. Along with this need, the function of so-called "marginless printing" has become popular. In "marginless printing", printing is performed on the entire surface of a paper sheet without leaving blank margins at sheet edges.

A structure for realizing marginless printing in the recording medium cut into a specified size in the conventional inkjet printer is shown in FIG. 2. In the conventional inkjet printer, an ink receiving slot 31 is arranged in a portion of a platen. Further, a paper sheet 32 is arranged so that edges of the paper sheet 32 (for example, horizontal edges, or vertical edges) are positioned over this ink receiving slot 31. When an ink drop 34 is jetted from a printing head 33, the ink drop 34 at the portion off the edge of the paper sheet (the portion without a paper sheet) is received by the ink receiving slot 31, and thereby marginless printing is carried out. However, this ink receiving slot 31 in the portion of the platen is not movable according to the width of a recording medium and is physically fixed. Accordingly, in the conventional inkjet printer, the width of the paper sheet on which marginless printing can be performed is restricted depending on the printer.

Next, it explains a structure for realizing marginless printing on a printing medium of roll paper. When marginless printing is carried out on a printing medium of roll paper, with regard to the horizontal edges of the paper sheet, printing is carried out as explained above. Meanwhile, with regard to the vertical edges, printing is carried out so that an image should be printed large enough to get out of the edges, and the portions out of the edges are cut off by a cutter for the roll paper (not shown), thereby the marginless printing is realized.

Thus, in both of the cut paper and the roll paper, in order to perform a completely marginless printing, an image is printed slightly beyond the paper size. Therefore, a printing image that is slightly larger than the paper size is required in the marginless printing.

As methods for realizing this printing, there are the following three methods.

Method 1

An image slightly larger than the paper size for printing is created by use of an application software, and the image is printed without being enlarged by a printer driver.

Method 2

A printer driver returns a resolution slightly larger than the resolution to be used for printing to an application software on a host computer, and by increasing the nominal number of pixels, a large printing image is obtained.

Method 3

As discussed in Japanese Patent Application Laid-Open No. 2002-091723 (corresponding to US Patent Appl. No. 2002-036665), by enlarging printing data from an application software to be larger than the paper size by a printer driver, a large printing image is created.

FIG. 3 illustrates the Method 3. In FIG. 3, the reference numeral 41 denotes a original size equivalent to an original image created by an application software, and reference numeral 42 denotes a marginless image size having a "protruding area" M necessary for enlarging the original size 41 and performing marginless printing. The reference numeral 43 denotes a print out size of a marginless printed matter obtained finally after printing the image and removing the vertical and horizontal protruding areas M.

However, when image data is enlarged according to the Method 1, it is necessary for a user to carry out a processing of enlarging the image to the necessary size on an application software, and this operation by the user becomes complicated.

Further, when image data is enlarged according to the Method 2 or the Method 3, an image at a specified edge is lost due to the influence of an aspect ratio, and an input image is impaired. This state is shown in FIG. 4A. In FIG. 4A, the reference numeral 61 denotes an image to be actually printed (input image), reference numeral 62 denotes an image enlarged to the size where marginless printing of the input image 61 is available while the aspect ratio thereof is maintained (image slightly larger than the printing paper size). Further, reference numeral 63 denotes a print out size obtained as the result of printing the enlarged image 62. Since the input image 61, the enlarged image 62, and the print out size 63 have all of a same aspect ratio, the difference between the long side and the short side of the input image 61 is large. If the aspect ratio becomes biased, the lack of the image in the longer direction is larger than the shorter direction.

With regards to the Method 3, for example, a method to obtain a printed matter with print out size 43 of A4 from an image with original size 41 of A4 is shown in detail. (Refer to FIGS. 3 and 5.)

First, at step S21, the size of the original size 41 is obtained. The size of the original size 41 is the same as the size of a paper sheet of A4 and is as shown below.

$SRC(x,y)=(210 \text{ mm}, 297 \text{ mm})$

Next, at step S22, the minimum image size for marginless printing is calculated. If the protruding amount M from the vertical and horizontal edges of the paper sheet required for the marginless printing is 3 mm, the horizontal width and the vertical height of the paper sheets become 6 mm larger respectively. Therefore, the minimum image size for the marginless printing is as shown below.

$IMAGE(x,y)=SRC(x,y)+(2M,2M)=(216 \text{ mm}, 303 \text{ mm})$

Next, at step S23, in order to obtain the image size for the marginless printing, magnification ratios of the image size for the marginless printing are calculated with respect to the original size in the vertical length and the horizontal width.

Magnification ratio in $x$ direction
$Rx=IMAGEx \div SRCx=216 \text{ mm} \div 210 \text{ mm}=102.86\%$ Magnification ratio in $y$ direction
$Rx=IMAGEy \div SRCy=303 \text{ mm} \div 297 \text{ mm}=102.02\%$ If the image for the marginless printing is generated by enlarging the image using the independent magnification ratios in x and y directions, the image is distorted. Therefore, the magnification ratios in the directions x and y are made identical. In this case, in order to eliminate the blank margins of the paper sheet, the larger magnification ratio (herein Rx) is adopted as the magnification ratio R (step S24).

Next, at step S25, the necessary image size is recalculated using the magnification ratio determined at the step S24.

$IMAGEx=210 \text{ mm} \times 102.86\% = 216.0 \text{ mm}$ $IMAGEy=297 \text{ mm} \times 102.86\% = 305.5 \text{ mm}$ When this image (216.0×305.5 mm) is printed onto the A4 size paper sheet (210×297 mm) (step S26), the image is lost by 6 mm in x direction, but by as much as 8.5 mm in y direction. This tendency becomes worse as the aspect ratio of the paper sheet becomes more biased.

According to the above method, when marginless printing of photograph data is performed, if the aspect ratio of the original photograph data is largely different from the aspect ratio of the paper sheet, edges of the original photograph data may be largely lost. Further, if loss in edges of the original photograph data is made small, margins (blank margins) are left in the print out image.

SUMMARY OF THE INVENTION

The present invention is directed to a printing system which realizes marginless printing and marginless enlargement printing without imposing a complicated operation to a user, while controlling the loss portions of an original image to a minimum.

According to one aspect of the present invention, there is provided a printing system including a host device operable to send image data, and a recording device configured to perform a marginless recording to edges of a roll-shaped recording medium based on the image data received from the host device. The host device includes a setting unit configured to set the width of the recording medium; a changing unit configured to change scaling ratio of the image data based on the width of the recording medium; and a sending unit configured to send the image data with the changed scaling ratio to the recording device. The recording device includes a receiving unit configured to receive the image data with the changed scaling ratio sent from the host device, and a recording unit configured to record the image on the recording medium based on the image data with the changed scaling ratio.

Further, according to another aspect of the present invention, there is provided a recording method in a recording device that performs a marginless recording to edges of a roll-shaped recording medium based on image data, the recording method comprising the steps of: setting the width of the recording medium; changing scaling ratio of the image data based on the width of the recording medium; and recording the image on the recording medium based on the image data with the scaling ratio changed in the changing step.

Furthermore, according to another aspect of the present invention, there is provided a recording device operable to perform a marginless recording to edges of a roll-shaped recording medium based on image data, the recording device comprising: a setting unit configured to set the width of the recording medium; a changing unit configured to change scaling ratio of the image data based on the width of the recording medium; and a recording unit configured to record the image on the recording medium based on the image data with the scaling ratio changed by the changing unit.

Moreover, according to another aspect of the present invention, there is provided a data processing device that processes and supplies data to a recording device that performs a marginless recording to edges of a roll-shaped recording medium based on the image data, the data processing device comprising: a setting unit configured to set the width of the recording medium; a changing unit configured to change scaling ratio of the image data based on the width of the recording medium; and a supplying unit configured to supply the image data with the scaling ratio changed by the changing unit to the recording device.

According to the present invention, marginless printing is carried out while an image is enlarged (or reduced) according to the width of a sheet of roll paper. Therefore, it is possible to perform an optimum marginless printing, while controlling the loss portions of an original image to a minimum.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

DETAILED DESCRIPTION OF THE EXEMPLARY EMBODIMENTS

Exemplary embodiments of the invention will be described in detail below with reference to the drawings.

In the present specification, a recording operation under following conditions is referred to as marginless printing. That is, image data is recorded on a recording medium up to its vertical or horizontal edges, and there is no margin at the edges.

Figure 1:
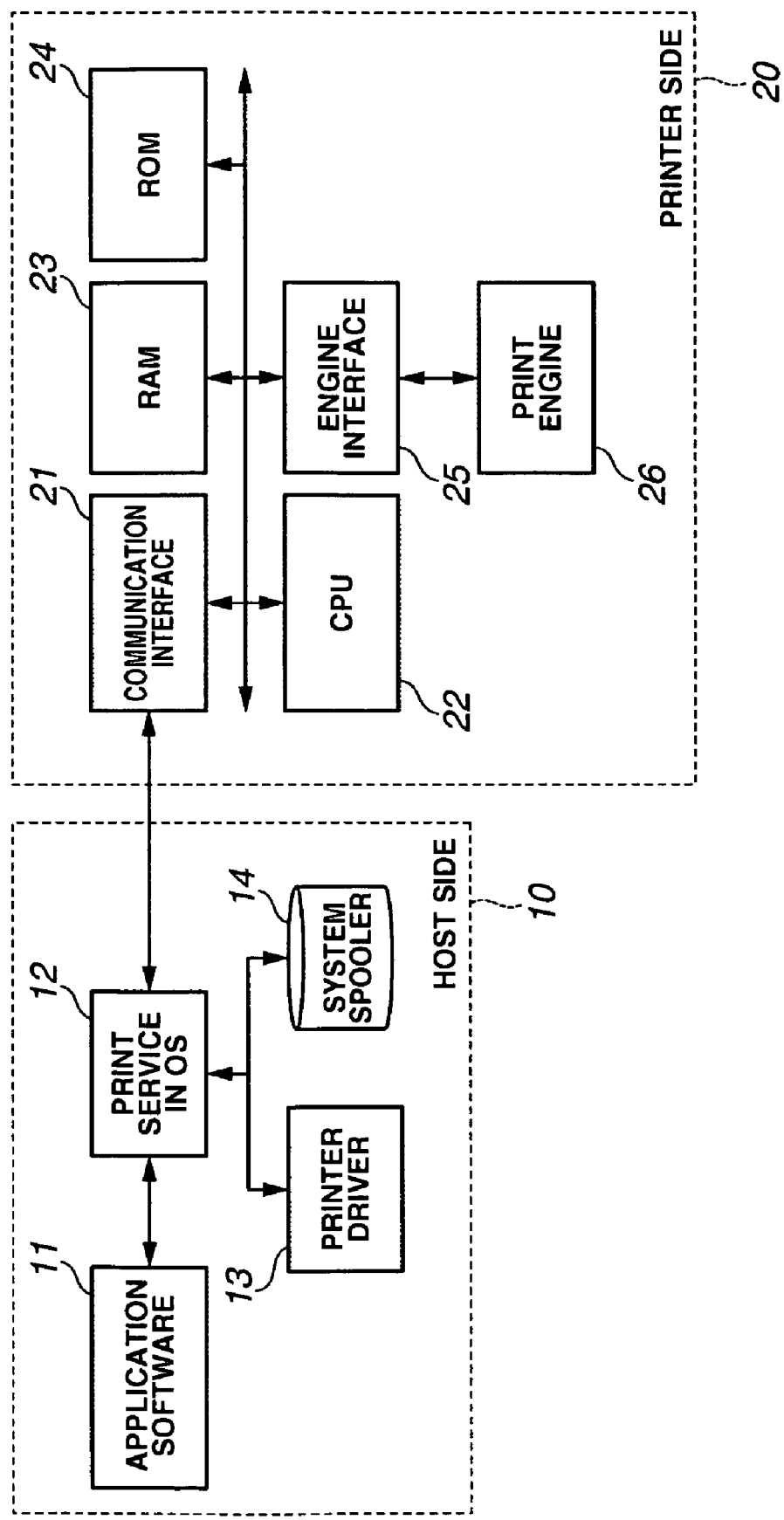
FIG. 1 is a block diagram showing components of a printer system according to an exemplary embodiment of the present invention.
Figure 2:
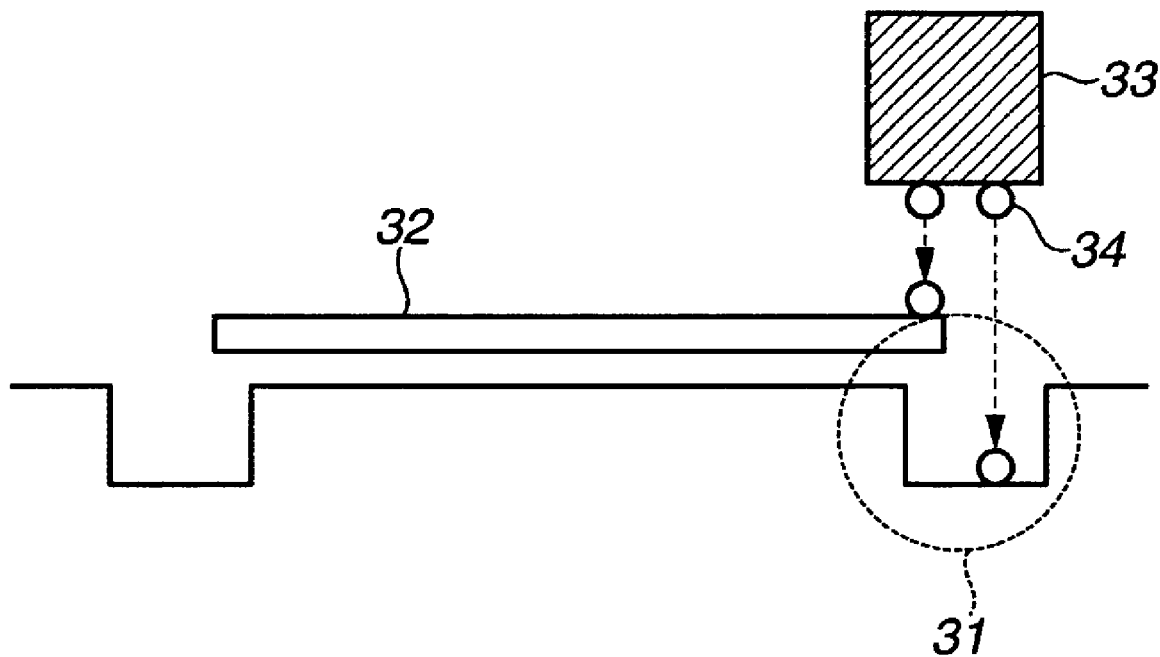
FIG. 2 is a view of an ink receiving mechanism in a printer for marginless printing.
Figure 3:
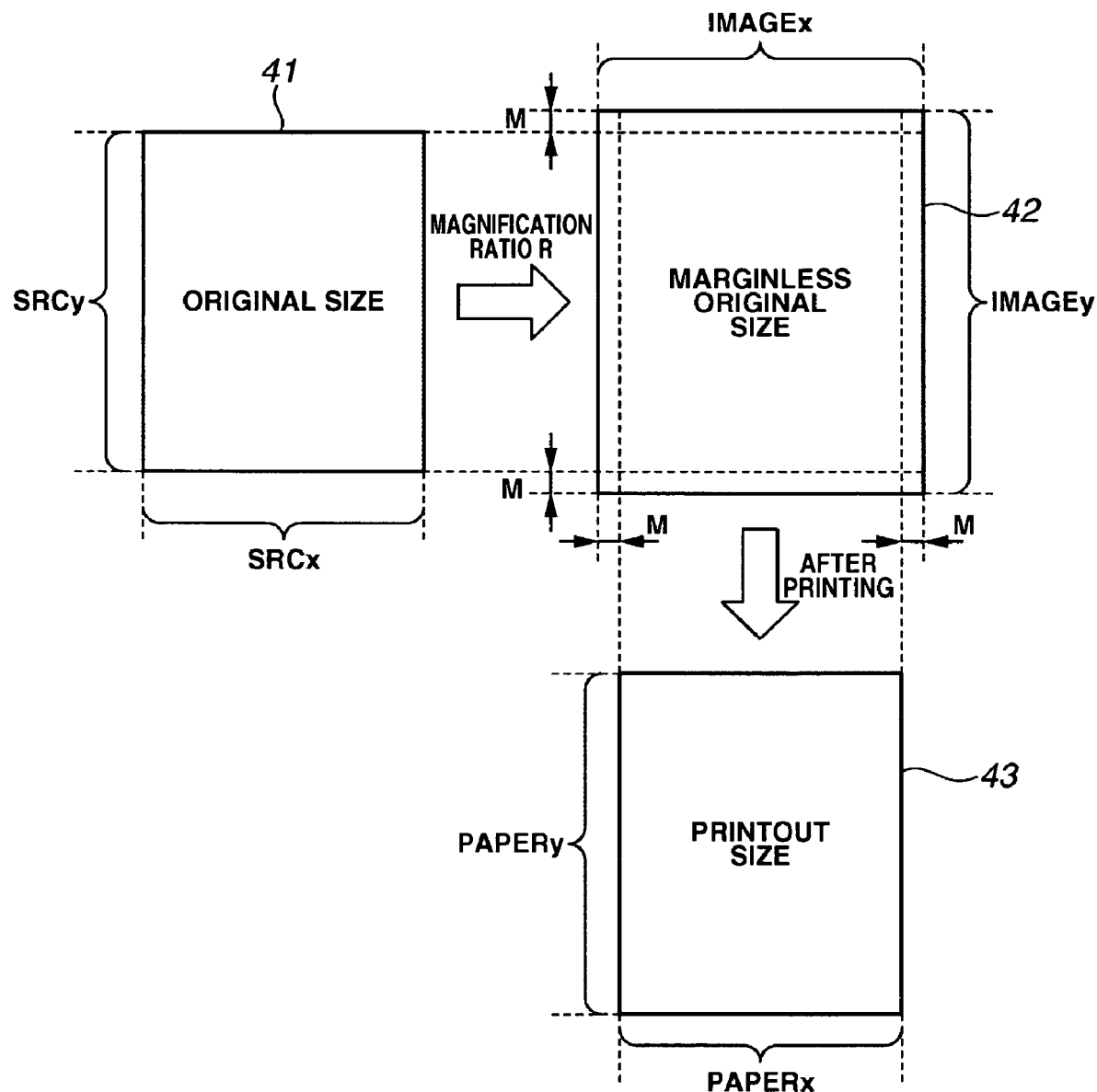
FIG. 3 is a schematic diagram showing marginless printing performed by enlarging an image.

FIG. 1 is a block diagram showing components of a printer system according to an exemplary embodiment of the present invention. In FIG. 1, reference numeral 10 denotes a host device which is a component concerning printing, such as a personal computer. Reference numeral 11 denotes application software for creating a print original, reference numeral 12 denotes an OS print service for mediating and transferring printing data according to a print request of the application software 11. Reference numeral 13 denotes a printer driver for converting printing data into a data format that can be processed by a printer 20 according to a print request of the operating system (OS) print service 12. Reference numeral 14 denotes a systems pooler for temporarily storing printing data before exchanging the same between the OS print service 12 and the printer driver 13, or transferring the same to the printer 20.

Reference numeral 20 denotes a printer for printing the printing data created by the printer driver 13. Reference numeral 21 denotes a communication interface for controlling data communication with the host device 10. The printer 20 receives printing data and various printing condition commands via the communication interface 21 from the host device 10. In general, a network interface or a USB is employed as the communication interface. Reference numeral 22 denotes a CPU for controlling the entire printer 20. Further, the CPU 22 rasterizes received printing data into drawing data according to programs and data stored in a RAM 23 and a ROM 24. The drawing data created is sent via an engine interface 25 to a print engine 26, and the print engine 26 controls a recording head and a paper feed mechanism of a recording medium according to the drawing data to print an image on the print surface of the paper sheet.

Figure 6:
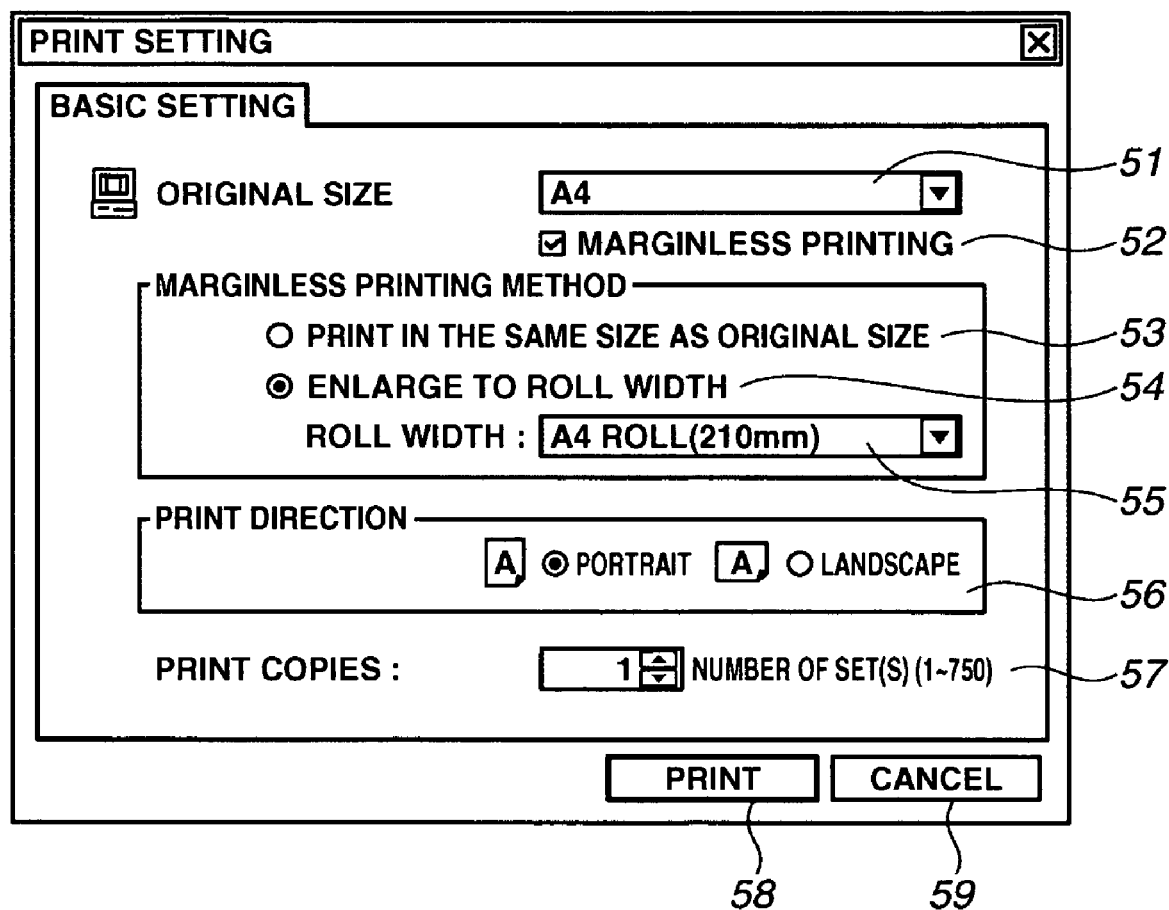
FIG. 6 is a view of an example user interface of a printer driver.

FIG. 6 is a view of a user interface of the printer driver 13 according to the present exemplary embodiment. In the figure, reference numeral 51 denotes a combo box for designating the original size of the data created by the application software 11. Reference numeral 52 denotes a check box for designating whether to perform marginless printing. Reference numerals 53 and 54 denote radio buttons for setting the marginless printing method. The button 53 is selected when an image is printed in the same size as the original size, and the button 54 is selected when data created by the application software 11 is enlarged to the roll width (width of roll paper) and printed. Reference numeral 55 denotes a combo box for designating the roll width in the case when the radio button 54 is selected, and displays the widths of roll paper that the printer 20 supported. Reference numeral 56 denotes a radio button for designating the print direction of the image created by the application software 11. When PORTRAIT is selected, printing is performed as portrait, and when LANDSCAPE is selected, printing is performed as landscape. Reference numeral 57 denotes an edit box for designating the number of print copies. Reference numerals 58 and 59 denote button controls for designating whether to complete the settings and perform the printing, or to cancel the settings.

In FIG. 6, when a user performs marginless printing to the roll paper, the user first checks the check box 52 for marginless printing. Next, as setting for the marginless printing method, the user selects the enlarging to roll width 54, and further sets the roll width 55. For example, when the original size 51 is A4, if the user sets the roll width 55 to A4 in the combo box 55, printing operations are performed to the roll paper in the same size as the original size. Further, in the combo box 55, if the user sets the roll width to be larger than A4, the data of the original size A4 is enlarged and printed in this size.

Figure 7:
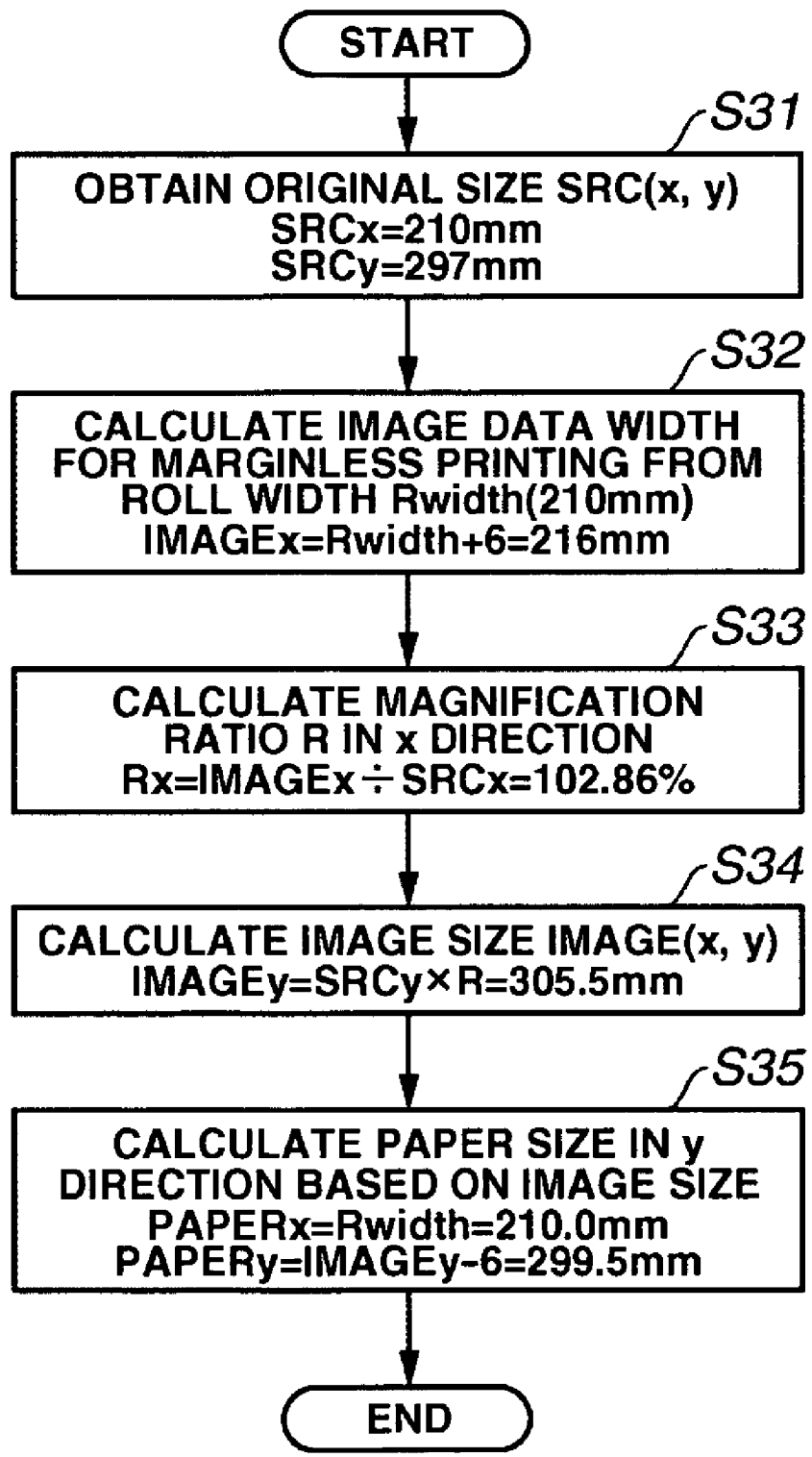
FIG. 7 is a flow chart showing calculations of magnification ratios and paper sizes for roll paper having the same width as an original image.

FIG. 7 is a flow chart showing calculations of the print area of the printer driver 13 according to the present exemplary embodiment. In the flow chart in FIG. 7, an example is shown where printing is performed on the roll paper having the same width as the original size 41. In this case, an image of which original size 41 is A4 is printed so as to fit the roll width 210 mm (equivalent to A4).

First, at step S31, the original size 41 is obtained. The size SRC (x, y) of the original size is as shown below.

$SRC(x,y)=(210\ mm,\ 297\ mm)$

Next, at step S32, the horizontal width of the image data for marginless printing is calculated. When the protruding amounts from the vertical and horizontal edges of the paper sheet for the marginless printing are 3 mm, the horizontal width (herein the left-right width) becomes 6 mm larger than the original size.

$IMAGEx=SRCx+M\times2=216\ mm$

Next, at step S33, the magnification ratio of the image size for the marginless printing to the image data is obtained.

Magnification ratio in $x$ direction
$Rx=IMAGEx\div SRCx=216\ mm\div210\ mm=102.86\%$ At step 34, in order to obtain the size of image loss in the case where the image data for the marginless printing is generated using the magnification ratio obtained at the step S33, the enlarged image size for the marginless printing is calculated.

$IMAGEx=210\ mm\times102.86\%=216.0\ mm$ $IMAGEy=297\ mm\times102.86\%=305.5\ mm$ At step S35, what is obtained by subtracting the protruding amount from the enlarged image size obtained at the step S34 is as shown below. Meanwhile, this is the print out size to be obtained as a printing result.

$PAPERx=IMAGEx-M\times2=210.0\ mm$ $PAPERy=IMAGEy-M\times2=299.5\ mm$

Thus, the print out size of a printed matter becomes approximately 2.5 mm longer than the original size in vertical direction. Because the recording device to which the present invention can be applied employs roll paper, the length in the vertical direction of the print out size can be easily changed. Therefore, it is possible to obtain a marginless printed matter in which loss portions of an image is controlled to a minimum. In this case, the aspect ratio of the original size is different from the aspect ratio of the print out size. However, the image is printed out according to the present invention so that the enlarged image for the marginless printing should be printed with as little loss as possible.

Figure 8:
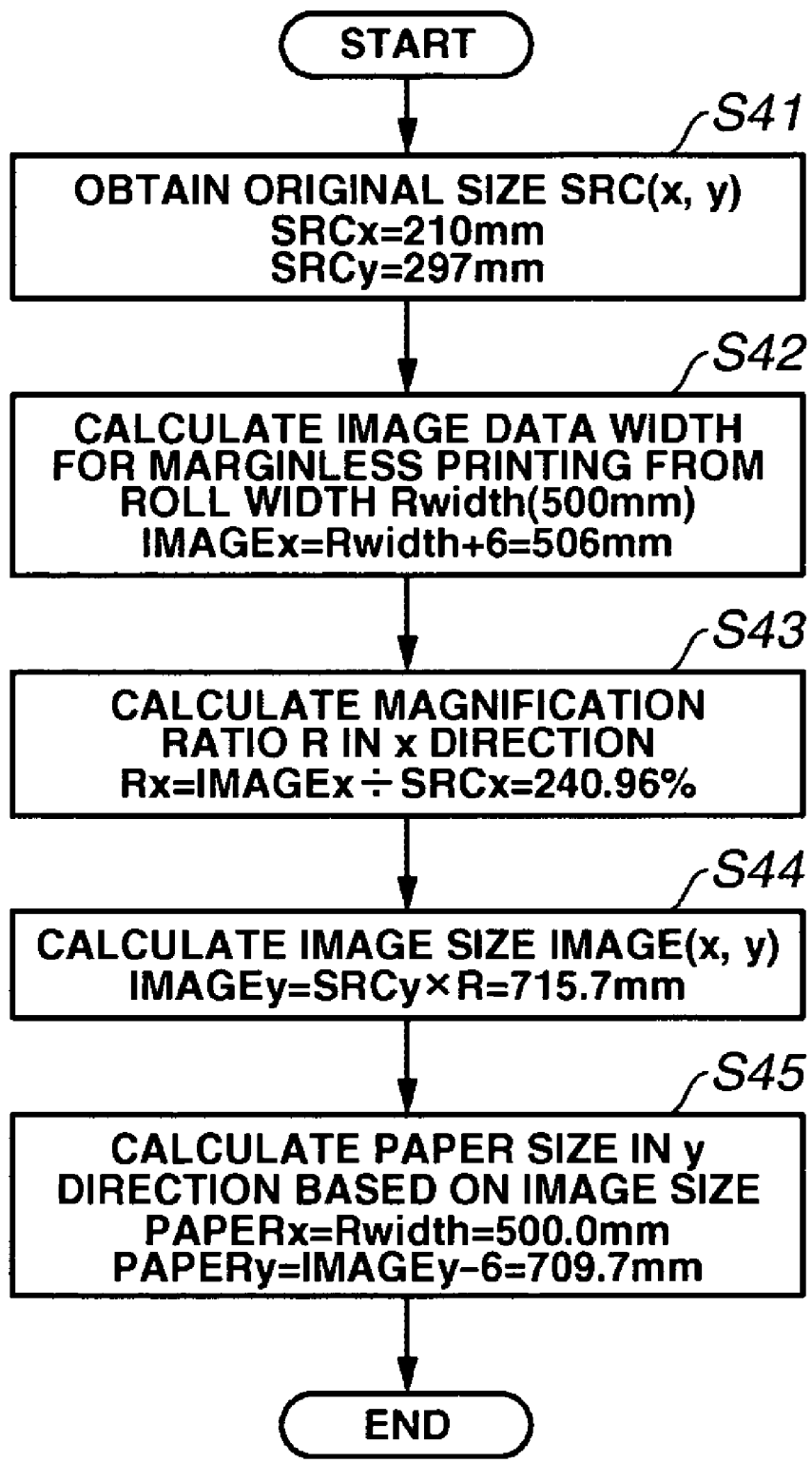
FIG. 8 is a flow chart showing calculations of magnification ratios and paper sizes for roll paper which is larger than an original image.

FIG. 8 is a flow chart showing calculations of the print area of the printer driver 13 according to the present exemplary embodiment. In the flow chart in FIG. 8, image data created by an application software is enlarged to fit a roll width larger than the original size 41 and marginless printing is performed. In this case, an image with original size 41 of A4 is enlarged to fit a roll width 500 mm to perform marginless printing as an example.

First, at step S41, the size of the original size 41 is obtained as follows:

$SRC(x,y)=(210\ mm,\ 297\ mm)$

Next, at step S42, the horizontal width of the image data for marginless printing is calculated as follows. When the protruding amounts from the vertical and horizontal edges of the paper sheet for the marginless printing are 3 mm, the horizontal width (herein the left-right width) becomes 6 mm larger than the roll width.

$IMAGEx=500\ mm+M\times2=506\ mm$

Next, at step S43, the magnification ratio of the image size for the marginless printing of the image data is obtained as follows:

Magnification ratio in $x$ direction
$Rx=IMAGEx\div SRCx=506\ mm\div210\ mm=240.96\%$ At step 44, by use of the magnification ratio obtained at the step S43, the enlarged image size used for the marginless printing is calculated as follows:

$IMAGEx=210\ mm\times240.96\%=506.0\ mm$ $IMAGEy=297\ mm\times240.96\%=715.7\ mm$ At step S45, an output size obtained by subtracting the protruding amount from the enlarged image size obtained at the step S44 is calculated as follows:

$PAPERx=IMAGEx-M\times2=500.0\ mm$ $PAPERy=IMAGEy-M\times2=709.5\ mm$

As is apparent from the above description, according to the present invention, marginless printing is carried out while an image is enlarged to the width of a sheet of roll paper. Therefore, it is possible to perform an optimum marginless printing, while controlling the loss portions of an original image to a minimum.

Figure 4A:
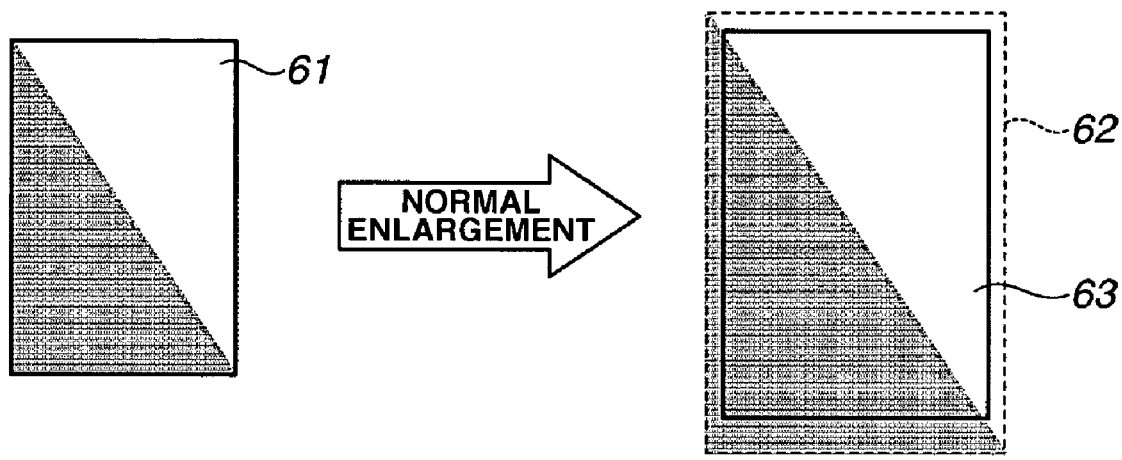
FIG. 4A and FIG. 4B are schematic diagrams showing marginless printing in which the aspect ratio is biased.
Figure 4B:
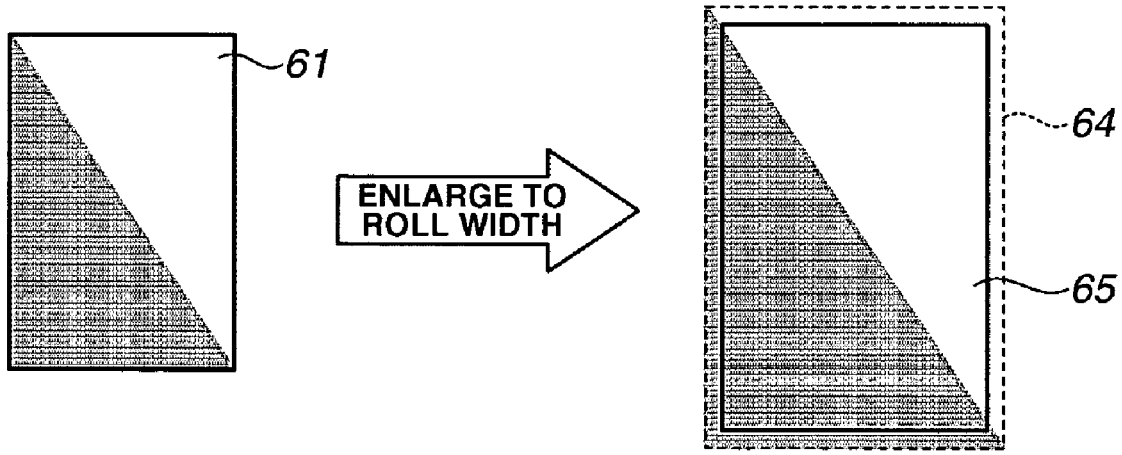
Figure 5:
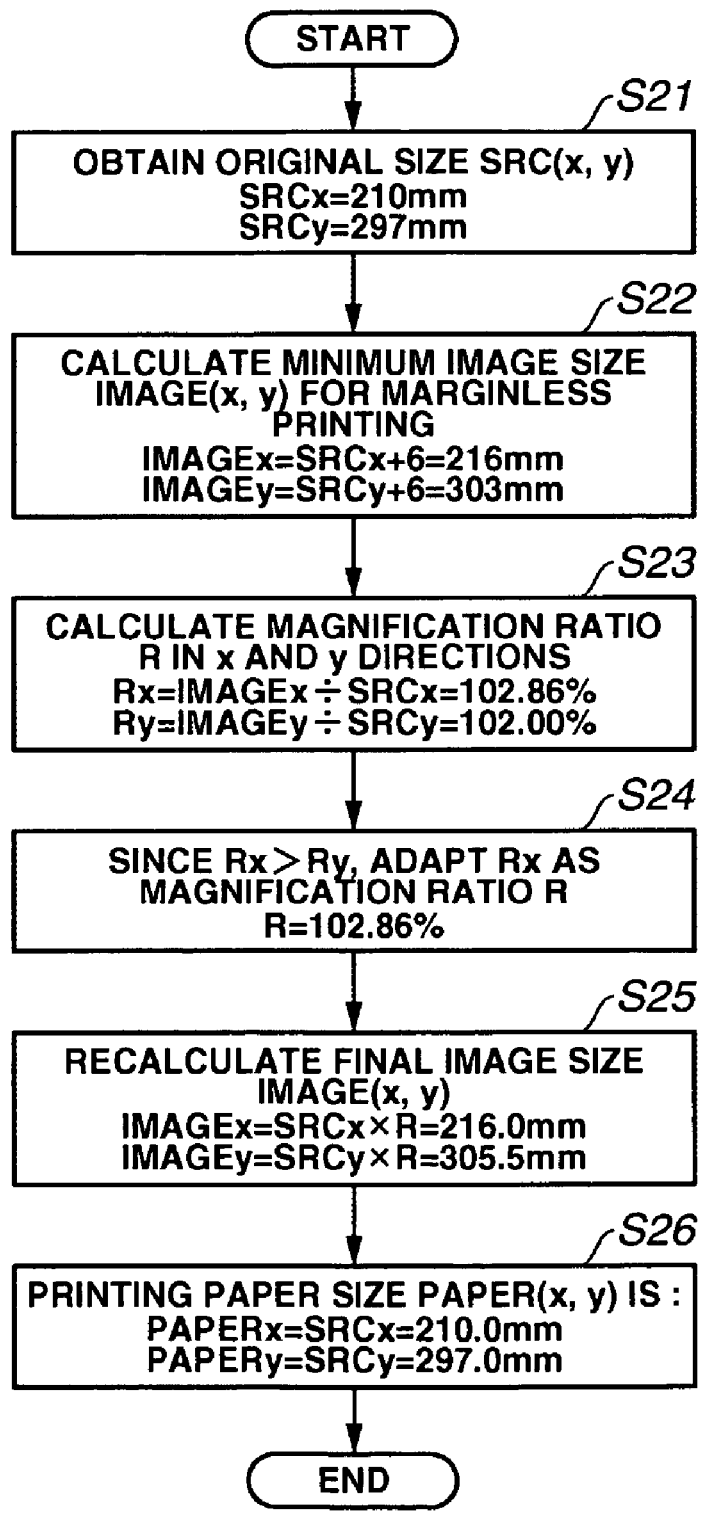
FIG. 5 is a flow chart showing calculations of magnification ratios and paper sizes in marginless printing performed by enlarging an image.

FIG. 4B shows a resultant state. In FIG. 4B, reference numeral 61 denotes an input image, reference numeral 64 denotes an image obtained by enlarging the input image 61 to the size for marginless printing to fit the width of the roll paper while the aspect ratio is maintained, and reference numeral 65 denotes the print out size obtained as a result of printing the enlarged image 63. In this case, the aspect ratio of the input image 61 is the same as the enlarged image 64. Since the print out size 65 is the result obtained by removing only minimally necessary "protruding area" from the enlarged image 64, the loss portions of an image can be controlled to a minimum while the aspect ratio is not maintained.

In the above exemplary embodiment, since the image size is smaller than the print out size, the image data is enlarged. On the other hand, when the image size is larger than the print out size, the image data may be reduced in the same manner and the print data for marginless printing can be generated.

Meanwhile, the enlargement/reduction in the exemplary embodiment does not merely mean the enlargement/reduction by magnification ratios of an integer value, but also includes the enlargement/reduction by the ratio of pixels of the input image and pixels of the print sheet size, and also an artificial enlargement by manipulating the resolution of an image.

Further, in the exemplary embodiment, a user sets the width of roll paper using the combo box 55 of the printer driver. However, in a printer (recording device) including a structure for detecting the width of a recording medium, a detected roll paper width may be set instead of a user's setting. The structure for detecting the width of a recording medium, for example, can be configured such that, when a carriage is scanned in a main scanning direction, the carriage detects the width of a recording medium using an optical sensor.

Furthermore, the process to enlarge/reduce the image data created by an application software to fit the width of a print paper sheet may be performed by a printer driver installed in a host device connected to a printer so that enlarged (or reduced) print data is sent to the printer. Moreover, data of the image size may be sent from the host device to the printer, and in the control unit of the printer, the process to fit the image size to the width of a paper sheet can be carried out. Meanwhile, in the present invention, the method for changing the scaling ratio of image data has not been specially referred to. Since the conventional method for changing the scaling ratio is employed in the present exemplary embodiment, description thereof has been omitted.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-057448 filed Mar. 2, 2005, which is hereby incorporated by reference herein in its entirety.

What is claimed is:

1. A print controlling apparatus for controlling a printing device which performs a marginless recording to edges of a roll-shaped recording medium based on image data of an original image, a length of a width direction of the original image being shorter than a length of a vertical direction of the original image, comprising:

a setting unit configured to set a width of the recording medium, the width of the recording medium corresponding to the width of the original image;

a specifying unit configured to specify scaling ratio of the image data of the original image based on the width of the recording medium and protruding amounts from the width of the recording medium for the marginless recording to the edge of the recording medium; and a determining unit configured to determine an output size of a vertical direction as an output size of a printed matter outputted by the printing device by subtracting a predetermined length from a length obtained by scaling the image data based on the scaling ratio specified by the specifying unit, the output size of the vertical direction determined by the determining unit being longer than the length of the vertical direction of the original image but being shorter than the length of the vertical direction of the scaled image data based on the specified scaling ratio.

2. The apparatus according to claim 1, wherein an aspect ratio of the image data before being scaled based on the scaling ratio specified by the specifying unit is different from an aspect ratio of an output size according to the width set by the setting unit and the output size of the vertical direction determined by the determining unit.

3. The apparatus according to claim 1, wherein the specifying unit specifies the scaling ratio based on the width of the recording medium and a width obtained by adding a predetermined width to the width of the image data.

4. The apparatus according to claim 1, wherein the print controlling apparatus sends the image data scaled, in the print controlling apparatus, based on the scaling ratio specified by the specifying unit.

5. The apparatus according to claim 1, wherein the print controlling apparatus sends the image data and causes the printing device to scale the sent image data based on the scaling ratio specified by the specifying unit.

6. A print controlling method of a print control apparatus for controlling a printing device that performs a marginless recording to edges of a roll-shaped recording medium based on image data of an original image, a length of a width direction of the original image being shorter than a length of a vertical direction of the original image, the print controlling method comprising:

setting a width of the recording medium the width of the recording medium corresponding to the width of the original image;

specifying scaling ratio of the image data based on the set width of the recording medium and protruding amounts from the width of the recording medium for the marginless recording to the edge of the recording medium; and determining an output size of a vertical direction as an output size of a printed matter outputted by the printing device by subtracting a predetermined length from a length obtained by scaling the image data based on the specified scaling ratio, specifying the output size of the vertical direction determined by the determining step is longer than the length of the vertical direction of the original image but is shorter than the length of the vertical direction of the scaled image data based on the specified scaling ratio.

7. The method according to claim 6, wherein an aspect ratio of the image data before being scaled based on the specified scaling ratio is different from an aspect ratio of an output size according to the set width and the determined output size of the vertical direction.

8. A tangible computer-readable storage medium storing a program for causing a computer to execute the method of claim 6.

* * * * *